(12) United States Patent
Nawroth et al.

(10) Patent No.: US 9,630,478 B2
(45) Date of Patent: Apr. 25, 2017

(54) SEAMLESS TAILGATE (75) Inventors: Manfred Nawroth, Wipperfürth (DE);
Ulrich Grosser, Kürten (DE);
Volkhard Krause, Leverkusen (DE);
Michael Wagner, Moers (DE)

(73) Assignee: Covestro Deutschland AG, Leverkusen (DE)

( * ) Notice: Subject to any disclaimer, the term of this patent is extended or adjusted under 35 U.S.C. 154(b) by 314 days.

(21) Appl. No.: 13/878,545

(22) PCT Filed: Oct. 25, 2011

(86) PCT No.: PCT/EP2011/068667
§ 371 (c)(1),
(2), (4) Date: Jul. 1, 2013

(87) PCT Pub. No.: WO2012/055873
PCT Pub. Date: May 3, 2012

(65) Prior Publication Data
US 2013/0280452 A1 Oct. 24, 2013

(30) Foreign Application Priority Data
Oct. 26, 2010 (DE) .................. 10 2010 042 939

(51) Int. Cl.
*B32B 3/10* (2006.01)
*B60J 5/10* (2006.01)
(Continued)

(52) U.S. Cl.
CPC ...... *B60J 5/10* (2013.01); *B32B 3/30* (2013.01); *B32B 27/365* (2013.01); *B60J 1/18* (2013.01); *B60J 5/107* (2013.01); *Y10T 428/1352* (2015.01); *Y10T 428/24479* (2015.01); *Y10T 428/24521* (2015.01); *Y10T 428/24612* (2015.01); *Y10T 428/31507* (2015.04)

(58) Field of Classification Search
CPC .................. B60J 5/10; B62D 33/023
See application file for complete search history.

(56) References Cited

U.S. PATENT DOCUMENTS 4,822,098 A † 4/1989 Vogt
2004/0041429 A1* 3/2004 McLaren et al. ............ 296/57.1
(Continued)

FOREIGN PATENT DOCUMENTS

DE 102004035030 A1 2/2006
DE 102009039631 A1 * 3/2011
(Continued)

OTHER PUBLICATIONS

Machine Translation of De102009039631 Retrieved Jun. 29, 2015.*
(Continued)

*Primary Examiner* — Christopher Polley
(74) *Attorney, Agent, or Firm* — Drinker Biddle & Reath LLP (57) ABSTRACT

The invention relates to a method for producing seamlessly manufactured vehicle components, in particular vehicle flaps, having a continuous support of a thermoplastic plastics material, which vehicle components have at least one transparent region that is an integral part of the support.

18 Claims, 4 Drawing Sheets

(51) Int. Cl.
*B32B 3/30* (2006.01)
*B32B 27/36* (2006.01)
*B60J 1/18* (2006.01)

(56) References Cited

U.S. PATENT DOCUMENTS

2006/0017304 A1* 1/2006 Bischoff ............... B60J 5/101
  296/140
2008/0274321 A1* 11/2008 Lefaux ............... B29C 45/0053
  428/38
2011/0241376 A1  10/2011 Igura

FOREIGN PATENT DOCUMENTS

| EP | 266 514 A2 | 5/1988 |
| EP | 1 787 841 A2 | 5/2007 |
| EP | 1787841 A2 † | 5/2007 |
| JP | 10 329165 A | 12/1998 |
| JP | 1998329165 A † | 12/1998 |
| JP | 2004331883 | 11/2004 |
| JP | 2007223445 | 9/2007 |
| WO | 2006/053547 A2 | 5/2006 |
| WO | 2006053547 A2 † | 5/2006 |
| WO | WO 2010086385 A1 * | 8/2010 |

OTHER PUBLICATIONS

Chris Smith, Bayer shows one-piece polycarbonate tailgate http://www.plasticsnews.com/article/20101108/PNEDATA/311089957/bayer-shows-one-piece-polycarbonate-tailgate Retrieved on Jun. 29, 2015.*

International Search Report of PCT/EP2011/068667 Mailed Jan. 6, 2012.

* cited by examiner
† cited by third party

SEAMLESS TAILGATE

CROSS REFERENCE TO RELATED APPLICATIONS

This application is a §371 National Stage Application of PCT/EP2011/068667, filed Oct. 25, 2011, which claims priority to German Application No. 102010042939.2 filed Oct. 26, 2010.

BACKGROUND OF THE INVENTION

Field of the Invention

The invention relates to a method for producing seamlessly manufactured vehicle components, in particular vehicle flaps, having a continuous support made of a thermoplastic plastics material, which vehicle components have at least one transparent region that is an integral part of the support.

Description of Related Art

In order to reduce the weight of the bodywork in automotive construction, panes of glass are, for example, replaced by sheets of transparent plastics. In addition, many external vehicle components, such as, for example, bumpers and protective edges, have for a long time already been manufactured from plastics material.

With regard to vehicle components, there is great interest in integrating various functional elements into the components but configuring the structure of the components in such a manner that the components can be manufactured in one piece on the basis of a single support material.

Components with a large surface area in particular must have sufficient stiffness to be able to withstand the mechanical demands that are made of them. At the same time, however, the components are to be so designed that their own weight is as low as possible.

In addition, ambitious demands are made in automotive construction especially for high-price vehicles as regards the visual appearance of the materials used in their construction. Inhomogeneities, or visual faults, in the surface of the component are not acceptable in this connection.

In addition, because of the ever more complex construction of vehicle components, there is at present an increased demand for efficient manufacturing methods which allow the components to be produced in as few steps as possible.

SUMMARY

Accordingly, it is an object of the present invention to provide seamlessly manufactured vehicle components which have high stiffness and low weight and which have at least one integrated transparent region and one or more integrated functional elements, wherein the entire surface of the component has a continuous, seamless, excellent optical quality.

It is a further object of the present invention to provide a method for producing the vehicle components according to the invention, in which all the manufacturing steps, including integration of the functional elements, can be carried out in one mould and the subsequent attachment and sealing of the functional elements is not necessary.

Surprisingly, it has been possible to achieve the stated object by a composite system based on a support made of thermoplastic plastics material. In a preferred embodiment of the present invention, the support is in one piece and is seamless.

DETAILED DESCRIPTION OF A PREFERRED EMBODIMENT

The support has a thickness of from 3 to 7 mm, preferably from 4 to 6 mm, particularly preferably from 4.5 to 5.5 mm. The thickness of the support varies by not more than 10%, preferably by not more than 5%, over the entire component.

Seamless within the scope of the present invention means that the outer surface of the component does not have any seams or junctions with a depth of more than 0.20 mm, more preferably of more than 0.15 mm and particularly preferably of more than 0.10 mm. Furthermore, the seams or junctions preferably have a width of not more than 0.20 mm, more preferably of not more than 0.15 mm and particularly preferably of not more than 0.10 mm.

The support consists of a thermoplastic plastics material, which is preferably transparent, and can be completely flat or curved to different degrees. Moreover, in both the flat form and the curved form, the support can in addition further be structured and/or shaped.

The support further has an outer surface area of at least 360,000 mm$^2$. Preferably, the support has a surface area of from 360,000 mm$^2$ to 3,600,000 mm$^2$, more preferably from 360,000 mm$^2$ to 3,300,000 mm$^2$, more preferably from 810,000 mm$^2$ to 3,000,000 mm$^2$ and particularly preferably from 810,000 mm$^2$ to 2,500,000 mm$^2$.

In an alternative embodiment, a portion of the support consists of a transparent plastics material, while a second portion consists of a directly integrally moulded non-transparent plastics material, wherein the moulding junctions satisfy the above-mentioned requirements as regards the seams and junctions. Preferably, the transparent portion consists of polycarbonate and the non-transparent portion of a polycarbonate blend, preferably with acrylonitrile butadiene or polyester (e.g. PET, PBT). The junction of the materials is preferably located in edge regions so that any uneven areas that occur are concealed.

Transparent within the scope of the present invention means that the plastics material has a light transmission (in accordance with ASTM 1003 or ISO 13468; indicated in % and light type D65/10°) of at least 6%, more preferably of at least 12% and particularly preferably of at least 23%. Furthermore, the haze is preferably less than 3%, more preferably less than 2.5% and particularly preferably less than 2.0%.

Thermoplastic plastics materials which can be used in the production of the support of the vehicle components according to the invention are polycarbonate, copolycarbonate, polyester carbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), polyamide, cyclic polyolefin, poly- or poly- or copolyacrylates and poly- or copoly-methacrylate such as, for example, poly- or copoly-methyl methacrylates (such as PMMA) and also copolymers with styrene such as, for example, transparent polystyrene acrylonitrile (PSAN), thermoplastic polyurethanes, polymers based on cyclic olefins (e.g. TOPAS®, a commercial product of Ticona), more preferably polycarbonate, copolycarbonate, polyester carbonate, aromatic polyesters or polymethyl methacrylate, or mixtures of the mentioned components, and particularly preferably polycarbonate and copolycarbonate.

Mixtures of a plurality of thermoplastic polymers, in particular when they can be mixed with one another to give a transparent mixture, are also possible, preference being given in a particular embodiment to a mixture of polycarbonate with PMMA (more preferably with PMMA<2 wt. %) or polyester.

A further particular embodiment comprises in this connection a mixture of polycarbonate and PMMA in an amount of less than 2.0 wt. %, preferably less than 1.0 wt. %, more preferably less than 0.5 wt. %, wherein at least 0.01 wt. % PMMA is present, based on the amount of polycarbonate, the PMMA preferably having a molar weight <40,000 g/mol. In a particularly preferred embodiment, the amount of PMMA is 0.2 wt. % and particularly preferably 0.1 wt. %, based on the amount of polycarbonate, the PMMA preferably having a molar weight <40,000 g/mol.

An alternative further particular embodiment comprises a mixture of PMMA and polycarbonate in an amount of less than 2 wt. %, preferably less than 1 wt. %, more preferably less than 0.5 wt. %, wherein at least 0.01 wt. % polycarbonate is present, based on the amount of PMMA.

In a particularly preferred embodiment, the amount of polycarbonate is 0.2 wt. %, and particularly preferably 0.1 wt. %, based on the amount of PMMA.

Suitable polycarbonates for the production of the plastics composition according to the invention are all known polycarbonates. These are homopolycarbonates, copolycarbonates and thermoplastic polyester carbonates.

The preparation of the polycarbonates preferably takes place by the interfacial process or the melt transesterification process, which are described variously in the literature.

With regard to the interfacial process reference is made by way of example to H. Schnell, "Chemistry and Physics of Polycarbonates", Polymer Reviews, Vol. 9, Interscience Publishers, New York 1964 p. 33 ff, to Polymer Reviews, Vol. 10, "Condensation Polymers by Interfacial and Solution Methods", Paul W. Morgan, Interscience Publishers, New York 1965, Chap. VIII, p. 325, to Dres. U. Grigo, K. Kircher and P. R. Müller "Polycarbonate" in Becker/Braun, Kunststoff-Handbuch, Vol. 3/1, Polycarbonate, Polyacetale, Polyester, Celluloseester, Carl Hanser Verlag Munich, Vienna 1992, p. 118-145, and also to EP 0 517 044 A1.

The melt transesterification process is described, for example, in the Encyclopedia of Polymer Science, Vol. 10 (1969), Chemistry and Physics of Polycarbonates, Polymer Reviews, H. Schnell, Vol. 9, John Wiley and Sons, Inc. (1964) and also in patent specifications DE-B 10 31 512 and U.S. Pat. No. 6,228,973.

The polycarbonates are preferably prepared by reactions of bisphenol compounds with carbonic acid derivatives, in particular phosgene or, in the case of the melt transesterification process, diphenyl carbonate or dimethyl carbonate.

Homopolycarbonates based on bisphenol A and copolycarbonates based on the monomers bisphenol A and 1,1-bis-(4-hydroxyphenyl)-3,3,5-trimethylcyclohexane are particularly preferred.

These and further bisphenol or diol compounds which can be used for the polycarbonate synthesis are disclosed inter alia in WO 2008037364 A1 (p. 7, l. 21 to p. 10, l. 5), EP 1 582 549 A1 ([0018] to [0034]), WO 2002026862 A1 (p. 2, l. 20 to p. 5, l. 14), WO 2005113639 A1 (p. 2, l. 1 to p. 7, l. 20).

The polycarbonates can be linear or branched. Mixtures of branched and unbranched polycarbonates can also be used.

Suitable branching agents for polycarbonates are known from the literature and are described, for example, in patent specifications U.S. Pat. No. 4,185,009 and DE 25 00 092 A1 (3,3-bis-(4-hydroxyaryl-oxindoles according to the invention, see in each case the whole document), DE 42 40 313 A1 (see p. 3, l. 33 to 55), DE 19 943 642 A1 (see p. 5, l. 25 to 34) and U.S. Pat. No. 5,367,044 and also literature cited therein.

In addition, the polycarbonates that are used can also be intrinsically branched, in which case branching agent is not added within the context of the polycarbonate preparation. An example of intrinsic branchings are so-called Fries structures, as are disclosed for melt polycarbonates in EP 1 506 249 A1.

Chain terminators can additionally be used in the polycarbonate preparation. There are used as chain terminators preferably phenols such as phenol, alkylphenols such as cresol and 4-tert-butylphenol, chlorophenol, bromophenol, cumylphenol or mixtures thereof.

The polycarbonates can additionally comprise conventional polymer additives, such as, for example, the flame retardants, optical brighteners, flow improvers, organic or inorganic colourants, heat stabilisers, inorganic pigments, demoulding agents or processing aids described in EP-A 0 839 623, WO-A 96/15102, EP-A 0 500 496 or "Plastics Additives Handbook", Hans Zweifel, 5th Edition 2000, Hanser Verlag, Munich.

UV absorbers or IR absorbers can further be present. Suitable UV absorbers are described, for example, in EP 1 308 084 A1, in DE 102007011069 A1 and in DE 10311063 A1.

Suitable IR absorbers are disclosed, for example, in EP 1 559 743 A1, EP 1 865 027 A1, DE 10022037 A1, DE 10006208 A1 and in Italian patent applications RM2010A000225, RM2010A000227 and RM2010A000228.

Of the IR absorbers mentioned in the cited literature, preference is given to those based on boride and tungstate and also to absorbers based on ITO and ATO and combinations thereof.

In a particularly preferred embodiment of the present invention, the thermoplastic plastics material for the support of the vehicle component is a polycarbonate having a molecular weight $M_w$ of from 22,000 to 30,000, more preferably from 24,000 to 28,000 and particularly preferably from 25,000 to 27,000, determined by gel permeation chromatography with polycarbonate calibration.

The flowability of the polycarbonate used for the production of the support is further sufficient to achieve flow paths in the injection compression moulding process of from 600 mm to 1200 mm, preferably from 800 mm to 1100 mm, particularly preferably from 900 mm to 1000 mm, the melt temperature being preferably from 280° C. to 320° C., more preferably from 300° C. to 310° C., the mould temperature being preferably from 60° C. to 110° C., more preferably from 80° C. to 100° C., the filling pressure being from 50 bar to 1000 bar, more preferably from 80 bar to 750 bar and particularly preferably from 100 bar to 500 bar, and the compression gap being from 0.5 mm to 10 mm, preferably from 2 mm to 7 mm, particularly preferably from 5 mm to 6 mm.

The vehicle components according to the invention comprising the support of thermoplastic plastics material, which is also referred to hereinbelow as the base layer (I) of the vehicle component according to the invention, can additionally comprise further layers within the scope of a multi-layer composite.

The support, all the layers bonded indirectly or directly thereto, and also the integrated functional elements form the vehicle component according to the invention.

The following functional elements can be integrally moulded with and/or integrated in the vehicle component according to the invention:
- hinges
- heating elements
- antennae
- closing functionalities
- lamp housing/holder, for example for rear lights, indicators, brake lights, registration plate light and high-level brake light
- windscreen wiper (and windscreen wiper motor) holder
- registration plate recess
- spoiler
- styling lines
- structural elements for water management (deflection of spray and rain water)
- number plate holder, external or internal
- solar modules.

One or more of the following layers can additionally be applied to the support in different sequences either on one side of the support or on both sides of the support. These include:

(II) layers for increasing the scratch resistance, in particular over the transparent viewing area of the vehicle component;

(III) layers for protecting against the effects of the weather, for example comprising UV absorbers and/or IR absorbers, such layers also including reflective layers for IR and UV radiation (IR radiation from 750 nm to 2500 nm, UV radiation from 400 nm to 180 nm);

(IV) colouring layers comprising colourants and/or pigments;

(V) layers for forming black edges, reinforcing frame elements. These can be produced from the above-mentioned thermoplastic plastics materials or mixtures thereof and are preferably not transparent;

(VI) mechanical reinforcing elements;

(VII) functional layers such as antifog and antireflection layers and also layers for controlling transparency (electrochromism, thermotropicity, thermochromism)

(VIII) damping and insulating layers.

Layers for increasing the scratch resistance (II):

Various methods are known for producing a scratch-resistant coating within the meaning of the present invention. For example, epoxy-, acrylic-, polysiloxane-, colloidal-silica-gel- or inorganic/organic- (hybrid systems) based lacquers can be used. These systems can be applied, for example, by dipping processes, spin coating, spraying processes or flood coating. Curing can take place thermally or by means of UV radiation. In a particular embodiment, the scratch-resistant layer is applied directly to the support in an inline process (direct coating/direct skinning).

Single-layer or multi-layer systems can be used. The scratch-resistant coating can be applied, for example, directly or after preparation of the substrate surface with a primer. A scratch-resistant coating can further be applied by plasma-assisted polymerisation processes, for example via an $SiO_2$ plasma.

It is further possible to use specific injection moulding processes, such as, for example, the back injection moulding of surface-treated films, to apply a scratch-resistant coating to the resulting moulded article.

Various additives, such as, for example, UV absorbers derived, for example, from triazoles or triazines, can be present in the scratch-resistant layer. IR absorbers of organic or inorganic nature can further be present. Such additives can be present in the scratch-resistant lacquer itself or in the primer layer. The thickness of the scratch-resistant layer is from 1 to 20 µm, preferably from 2 to 15 µm. Below 1 µm, the durability of the scratch-resistant layer is unsatisfactory. Above 20 µm, cracks occur more frequently in the lacquer. The base material according to the invention, which is described in the present invention, is preferably provided with an above-described scratch-resistant and/or antireflection coating after the injection-moulded article has been finished, because the preferred field of use is in the field of window or automotive glazing.

For polycarbonates there is preferably used a primer comprising UV absorber in order to improve the adhesion of the scratch-resistant lacquer. The primer can comprise further stabilisers such as, for example, HALS systems (stabilisers based on sterically hindered amines), adhesion promoters, flow aids.

The resin in question can be selected from a large number of materials and is described, for example, in Ullmann's Encyclopedia of Industrial Chemistry, 5th Edition, Vol. A18, pp. 368-426, VCH, Weinheim 1991. Polyacrylates, polyurethanes, phenol-based, melamine-based, epoxy and alkyd systems or mixtures of those systems can be used. The resin is in most cases dissolved in suitable solvents—frequently in alcohols.

Depending upon the chosen resin, curing can take place at room temperature or at elevated temperatures. Temperatures of from 50° C. to 130° C. are preferably used—frequently after a large part of the solvent has briefly been removed at room temperature. Commercially available systems are, for example, SHP470, SHP470FT-2050 and SHP401 from Momentive Performance Materials. Such coatings are described, for example, in U.S. Pat. No. 6,350,512 B1, U.S. Pat. No. 5,869,185, WO 2006/108520 and EP 1308084.

Scratch-resistant lacquers (hard-coat) are preferably composed of siloxanes and preferably comprise UV absorbers. They are preferably applied by dipping or flow processes. Curing takes place at temperatures of from 50° C. to 130° C. Commercially available systems are, for example, AS4000, SHC5020 and AS4700 from Momentive Performance Materials. Such systems are described, for example, in U.S. Pat. No. 5,041,313, DE 3121385, U.S. Pat. No. 5,391,795, WO 2008/109072. The synthesis of those materials takes place in most cases by condensation of alkoxy- and/or alkylalkoxy-silanes with acid or base catalysis. Nanoparticles can optionally be incorporated. Preferred solvents are alcohols such as butanol, isopropanol, methanol, ethanol and mixtures thereof.

Instead of primer/scratch-resistant coating combinations, one-component hybrid systems can be used. These are described, for example, in EP 0570165 or WO 2008/071363 or DE 2804283. Commercially available hybrid systems are obtainable, for example, under the names PHC587 or UVHC 3000 from Momentive Performance Materials.

In a particularly preferred process, the application of the lacquer is carried out by the flood process because it results in coated parts of high optical quality.

The flood process can be carried out manually with a hose or a suitable coating head or automatically in a continuous process by means of flood lacquering robots and optionally slot nozzles.

The components can be coated either while suspended or while mounted in a corresponding product holder.

In the case of larger and/or 3D components, the part to be coated is suspended or placed in a suitable product holder.

In the case of small parts, coating can also be carried out by hand. In that case, the liquid primer or lacquer solution to be used for the coating is poured over the sheet in the longitudinal direction starting from the upper edge of the small part, while the starting point of the lacquer on the sheet is at the same time guided from left to right over the width of the sheet. The lacquered sheets are suspended vertically from a clamp and the solvent is evaporated off and curing is carried out according to the manufacturer's instructions.

Layers for protecting against the effects of the weather (III)

The layers (III) are preferably based on thermoplastic plastics materials, there preferably being used here the thermoplastic plastics materials that are also used for the production of the support (I). Polycarbonates and poly- or copoly-methacrylates such as, for example, poly- or copoly-methyl methacrylates (such as PMMA) are particularly preferred. The thermoplastic plastics materials used for the production of (III) are so provided with additives that their resistance to radiation in particular in the range from 180 nm to 400 nm and/or in the range from 750 nm to 2500 nm is increased significantly.

There are used for that purpose UV absorbers (see, for example, EP 1 308 084 A1, DE 102007011069 A1 or DE 10311063 A1) and/or IR absorbers (see, for example, EP 1 559 743 A1, EP 1 865 027 A1, DE 10022037 A1, DE 10006208 A1 and Italian patent applications RM2010A000225, RM2010A000227 and RM2010A000228).

Further conventional polymer additives, such as, for example, the optical brighteners, flow improvers, heat stabilisers, demoulding agents or processing aids described in EP-A 0 839 623, WO-A 96/15102, EP-A 0 500 496 or "Plastics Additives Handbook", Hans Zweifel, 5th Edition 2000, Hanser Verlag, Munich can also be present.

The layers for protecting against the effects of the weather (III) can be prepared by processes as are conventional for the manufacture of multi-layer systems comprising a base layer and optional top layer/top layers. Those processes include (co)extrusion, direct skinning, direct coating, insert moulding, film back injection moulding, or other suitable processes known to the person skilled in the art.

Injection moulding processes are known to the person skilled in the art and are described, for example, in "Handbuch Spritzgiessen", Friedrich Johannaber/Walter Michaeli, Munich; Vienna: Hanser, 2001, ISBN 3-446-15632-1 or "Anleitung zum Bau von Spritzgiesswerkzeugen", Menges/Michaeli/Mohren, Munich; Vienna: Hanser, 1999, ISBN 3-446-21258-2.

Extrusion processes are known to the person skilled in the art and are described, for example for coextrusion, inter alia in EP-A 0 110 221, EP-A 0 110 238 and EP-A 0 716 919. For details of the adapter and die process see Johannaber/Ast: "Kunststoff-Maschinenführer", Hanser Verlag, 2000 and Gesellschaft Kunststofftechnik: "Coextrudierte Folien und Platten: Zukunftsperspektiven, Anforderungen, Anlagen und Herstellung, Qualitätssicherung", VDI-Verlag, 1990.

As the material for the production of black edges or reinforcing frame elements (V) there can be used thermoplastic plastics materials comprising fillers or reinforcing materials, in particular plastics blends provided therewith. Preference is given in this connection to blends comprising polycarbonate and at least one further thermoplastic plastics material.

The fillers and reinforcing materials that are used can be in fibre, platelet, tube, rod or bead form, that is to say spherical or particulate. The fillers and reinforcing materials that are suitable within the scope of the present invention include, for example, talc, wollastonite, mica, kaolin, kieselguhr, calcium sulfate, calcium carbonate, barium sulfate, glass fibres, glass beads or ceramics beads, hollow glass beads or hollow ceramics beads, glass wool or mineral wool, carbon fibres or carbon nanotubes. Preferred fillers are fillers that bring about an isotropic shrinkage behaviour of the composition.

Within the context of the present invention, the use of talc and short glass fibres is particularly preferred.

Glass beads or ceramics beads or hollow glass beads or hollow ceramics beads can increase the scratch resistance of the surface.

In the compositions (V), the content of fillers and reinforcing materials is from 5 wt. % to 40 wt. %, preferably from 7 wt. % to 30 wt. %, more preferably from 8 wt. % to 25 wt. %, the percentages by weight being based on the total composition of (V).

The material used for the preparation of (V) can further optionally comprise the conventional polymer additives described in EP-A 0 839 623, WO-A 96/15102, EP-A 0 500 496 or "Plastics Additives Handbook", Hans Zweifel, 5th Edition 2000, Hanser Verlag, Munich.

These include inter alia organic and/or inorganic colourants or pigments, UV absorbers, IR absorbers, demoulding agents, heat stabilisers or processing stabilisers.

In a particular embodiment of the present invention, the plastics material blend is a blend comprising at least one polycarbonate and at least one polyester, the polyester preferably being a polyalkylene terephthalate, more preferably polyethylene terephthalate (PET) or polybutylene terephthalate (PBT). PET is particularly preferred as the polyester.

The amount of polycarbonate in the polycarbonate/polyester blends is from 10 wt. % to 90 wt. %, preferably from 30 wt. % to 80 wt. %, more preferably from 35 wt. % to 70 wt. %, particularly preferably from 40 wt. % to 65 wt. %, in each case based on the total composition of (V).

The amount of polyester in the polycarbonate/polyester blends is from 60 wt. % to 5 wt. %, preferably from 50 wt. % to 10 wt. %, more preferably from 35 wt. % to 10 wt. %, particularly preferably from 25 wt. % to 15 wt. %, in each case based on the total composition of (V).

The compositions of (V) can optionally also comprise elastomer modifiers, which can be present in amounts of from 0 wt. % to 25 wt. %, preferably from 3 wt. % to wt. %, more preferably from 6 wt. % to 20 wt. % and particularly preferably from 8 wt. % to 18 wt. %. Here too, the percentages by weight are based on the total composition of (V).

In an alternative particular embodiment of the present invention, the plastics material blend is a composition comprising the plastics materials A) and B), wherein
  A) is from 10 to 100 parts by weight, preferably from 60 to 95 parts by weight, particularly preferably from 75 to 95 parts by weight, in particular from 85 to 95 parts by weight (based on the sum of components A) and B)) of at least one component selected from the group consisting of aromatic polycarbonate, aromatic polyester carbonate, polymethyl methacrylate (co)polymer and polystyrene (co)polymer, and
  B) is from 0 to 90 parts by weight, preferably from 5 to 40 parts by weight, particularly preferably from 5 to 25 parts by weight, in particular from 5 to 15 parts by weight (based on the sum of components A) and B)) of at least one graft polymer. The graft polymer is preferably prepared by the emulsion polymerisation process, suspension process, mass polymerisation process or solution process.

C) optionally rubber-free vinyl homopolymer and/or rubber-free vinyl copolymer, wherein the sum of the amounts by weight of components A and B is 100.

Component B preferably comprises one or more graft polymers of

B.1.1 from 5 to 95 wt. %, preferably from 30 to 90 wt. %, of at least one vinyl monomer on B.1.2 from 95 to 5 wt. %, preferably from 70 to 10 wt. %, of one or more graft bases.

The glass transition temperatures of the graft bases are preferably <10° C., preferably <0° C., particularly preferably <−20° C.

The graft base B.1.2 generally has a mean particle size ($d_{50}$ value) of from 0.05 to 10 μm, preferably from 0.1 to 5 μm, particularly preferably from 0.15 to 1 μm.

Monomers B.1.1 are preferably mixtures of

B.1.1.1 from 50 to 99 parts by weight vinyl aromatic compounds and/or vinyl aromatic compounds substituted on the ring (such as styrene, α-methylstyrene, p-methylstyrene, p-chlorostyrene) and/or methacrylic acid ($C_1$-$C_8$)-alkyl esters (such as methyl methacrylate, ethyl methacrylate) and B.1.1.2 from 1 to 50 parts by weight vinyl cyanides (unsaturated nitriles such as acrylonitrile and methacrylonitrile) and/or (meth)acrylic acid ($C_1$-$C_8$)-alkyl esters, such as methyl methacrylate, n-butyl acrylate, tert-butyl acrylate, and/or derivatives (such as anhydrides and imides) of unsaturated carboxylic acids, for example maleic anhydride and N-phenylmaleimide.

Preferred monomers B.1.1.1 are selected from at least one of the monomers styrene, α-methylstyrene and methyl methacrylate; preferred monomers B.1.1.2 are selected from at least one of the monomers acrylonitrile, maleic anhydride and methyl methacrylate. Particularly preferred monomers are B.1.1.1 styrene and B.1.1.2 acrylonitrile.

Graft bases B.1.2 suitable for the graft polymers B.1 are, for example, diene rubbers, EP(D)M rubbers, that is to say rubbers based on ethylene/propylene and optionally diene, acrylate, polyurethane, silicone, chloroprene and ethylene/vinyl acetate rubbers and also silicone/acrylate composite rubbers.

Preferred graft bases B.1.2 are diene rubbers, for example based on butadiene and isoprene, or mixtures of diene rubbers or copolymers of diene rubbers or mixtures thereof with further copolymerisable monomers (e.g. according to B.1.1.1 and B.1.1.2), with the proviso that the glass transition temperature of component B.2 is <10° C., preferably <0° C., particularly preferably <−20° C. Pure polybutadiene rubber is particularly preferred.

Particularly preferred polymers B.1 are, for example, ABS polymers (emulsion, mass and suspension ABS), as are described, for example, in DE-OS 2 035 390 (=U.S. Pat. No. 3,644,574) or in DE-OS 2 248 242 (=GB-PS 1 409 275) or in Ullmanns, Enzyklopädie der Technischen Chemie, Vol. 19 (1980), p. 280 ff. The gel content of the graft base B.1.2 is at least 30 wt. %, preferably at least 40 wt. % (measured in toluene).

The glass transition temperature is determined by means of differential scanning calorimetry (DSC) according to standard DIN EN 61006 at a heating rate of 10 K/min with definition of the $T_g$ as the mid-point temperature (tangent method).

Preferably, A) is polycarbonate and B) is acrylonitrile butadiene styrene (ABS).

In order to avoid component stresses, it must be ensured that the coefficients of thermal expansion of the individual layers are matched to one another by a suitable choice of materials.

That is particularly important when a black edge or frame element is applied directly to the support of the vehicle component according to the invention.

It has been found to be advantageous in this connection to choose for the black edge, or frame element, a material whose coefficient of linear thermal expansion in the longitudinal direction (i.e. viewed from the sprue in the direction of the melt flow, abbreviated to RS hereinbelow) is lower than that of the material of the support. In addition, the RS/QS ratio of the coefficient of linear thermal expansion of the material in question should lie within a relatively narrow range, QS meaning the transverse direction, that is to say the direction orthogonal to the direction of the melt flow viewed from the sprue.

In an embodiment of the present invention, the coefficient of linear thermal expansion of the frame material in the longitudinal direction is from $1 \times 10^{-5}$ to $3 \times 10^{-5}$ (mm/mm K) lower than that of the support material.

The quotient RS/RQ should lie in a range from 0.6 to 1.0.

The material for forming the black edge, or reinforcing frame element, is preferably bonded to the support by partial back injection moulding of the support.

Because the support preferably consists of a transparent thermoplastic plastics material, it is possible to create a viewing area in the sense of a window pane by the back injection moulding of the black edge, or of the reinforcing frame element. Based on the entire vehicle component according to the invention, the transparent viewing area represents in total from 10 to 90%, more preferably from 20 to 75% and particularly preferably from 30 to 50%, of the surface area of the component and can be continuous or in the form of transparent part-regions which are visually separated from one another by non-transparent back-injected material.

In that manner it is possible to create transparent surfaces behind which lamps or markings are arranged.

The major advantage of that embodiment is that it is no longer necessary for a pane to be glued in place and sealed, as in production concepts conventional hitherto, which simplifies the outlay in terms of assembly and logistics.

In the case of bonnets and tailgates, the number of components for the lighting elements is reduced at least by the components that were attached on the outside in the hitherto existing design. Sealing of the lamps is also no longer necessary; it has also been possible to integrate the recess for the logo into the component.

The transparency of the support material additionally enables the vehicle registration plate to be fitted behind the support, for example in order to protect against theft. Moreover, instead of separately fitted locks and handles, light sensors can be fitted behind the exterior polycarbonate shell, by means of which light sensors the flap or door can be opened and closed.

The reinforcing elements (VI) impart to the vehicle component according to the invention a high degree of stiffness with, at the same time, a low weight, and within the context of the present invention they preferably have a base body, a ribbed structure and a support profile and are preferably produced by the injection moulding process or extrusion process and can consist of the same material or different materials. The support (I) itself or a layer bonded indirectly or directly thereto can preferably also form the base body for the reinforcing element.

The reinforcing elements (VI) can extend over the entire surface of one side of the support, with the exception of the transparent viewing areas. However, the positioning of (VI) on part-regions of the support outside the viewing area is also possible. Such part-regions include in particular regions which are subject to particularly high mechanical stresses. In the case of moving automotive parts, they can be, for example, the regions into which hinges or moving functional parts such as windscreen wipers are integrated.

Suitable materials for the ribbed structure are thermoplastic plastics materials. There is suitable in particular an unreinforced, reinforced and/or filled plastics material based on polyamide (PA), polyester, in particular polyethylene terephthalate (PET), polybutylene terephthalate (PBT), polyacrylates, in particular polymethyl methacrylate (PMMA), polybutylene terephthalate (PBT), polystyrene (PS), syndiotactic polystyrene, acrylonitrile-butadiene-styrene (ABS), polyolefin, in particular polypropylene (PP), polyethylene (PE), polycarbonate (PC), copolycarbonate (CoPC), copolyester carbonate or a mixture of those plastics materials.

In a preferred embodiment, the plastics materials are amorphous thermoplastic plastics materials, in particular polycarbonate, copolycarbonate, copolyester carbonate, PC blends and polymethyl methacrylate.

The support profile inserted into the ribbed structure can consist of one part or of a plurality of parts. It can either be solid or manufactured with cavities, channels or the like. In the simplest form, which is preferred, the support profile is an I-shaped profile, an L-shaped profile or a T-shaped profile. A U-shaped profile is also possible, which also, for example, connects pairs of ribs. It can be a closed profile, for example a rectangular tube. In that case, the geometries of the narrow and broad side faces can be identical. With appropriate geometry, the support profile can contain, for example, one or more channels which can be used to accommodate cables and hoses or to carry fluids. The geometry of the faces of the support profile can correspond to the ribs, so that the inserted profile has the same height as the ribs; however, it can also be lower or higher than the ribs, so that it may protrude beyond the ribs, or from the bundle of ribs. The geometry of the support profile can be such that it can perform further functions, for example as a fastening element. In that case, the support profile is already a semi-finished product with properties that go beyond the simple reinforcing function. The support profile can likewise be so designed that a force-based and/or interlocking connection with at least one further component runs over the structure of the support profile.

According to the invention, at least one broad side face of the support profile is adhesively bonded to a rib, and a narrow side face of the profile is positioned on the plastics base body. The broad side face of the profile and the face of the plastics base body are accordingly perpendicular or approximately perpendicular (at an angle of approximately from 70 to 110°) to one another.

The support profile can be made of metallic, fibre composite or ceramics materials. It can be produced by extrusion, punching, deep drawing, roll forming or other shaping processes.

The support profile is preferably produced from a metallic material. In a particularly preferred embodiment, the support profile is a simple reinforcing profile made of a sheet metal, preferably of steel, iron, titanium, aluminium or magnesium or alloys of those metals. In a particularly preferred embodiment, the support profile is a rolled steel strip or an extruded aluminium profile.

In other embodiments, the profiles can also be made of ceramics, thermosetting materials or plastics composite materials.

The structural adhesive used for the adhesive bonding can be a commercially available adhesive as is used, for example, in the automotive industry for the adhesive bonding of panes or sheet-metal structures. Wet adhesives, contact adhesives, hot-melt adhesives or reaction adhesives can be used. One- or two-component polyurethane-based structural adhesives with different stiffnesses are particularly suitable for this technology. It is, however, also possible to use acryl/acrylate-, methyl-methacrylate-, silicone- or epoxy-resin-based adhesives. In the bundle of ribs, the adhesive layer can have a thickness of up to several millimeters. The minimum thickness of the adhesive layer is given by requirements as regards the flexibility of the adhesive layer and accordingly by the materials and the geometry of the composite components and the demands made of the composite component. The thickness of the adhesive layer can be adjusted by altering the spacing between two ribs that are bonded together by adhesive technology, as a result of which the nature and degree of stiffness and isolation can flexibly be adjusted. The adhesive can also be a thermoplastically processable hot-melt adhesive. In that case it is possible to bond the plastics material, the hot-melt adhesive and the support profile to the composite part in a multi-component injection moulding operation.

In a preferred embodiment, the adhesive layer is from 0.5 to 10 mm thick, in a particularly preferred embodiment from 1 to 5 mm thick.

The adhesive, or resilient bonding material, can optionally additionally also enter into an interlocking connection. In the case of smaller relative movements between the composite components, the adhesive serves as a bonding and isolating element. High stresses are transmitted by the adhesive surfaces over a large area and not punctually, so that stress peaks and the disadvantages associated therewith do not occur in the component. Different coefficients of thermal expansion in the present large components can thus be compensated for by way of the adhesive.

In a preferred embodiment, the component surface is treated with a primer before the adhesive is applied.

The production of the reinforcing elements (VI) can be carried out as follows. On the one hand, the reinforcing element (VI) comprising a base body and a ribbed structure comprising at least one rib or at least one pair of ribs can be produced by means of single-, two- or multi-component injection moulding or extrusion processes, at least one face of a support profile further being bonded to at least one rib face by adhesive technology. If a support profile is bonded to two adjacent ribs, it can first be inserted between the ribs and then glued in place. It is equally possible first to press the adhesive between the ribs and then insert the support profile.

In a preferred embodiment, the support profile is in contact with the base body only by way of the adhesive, or resilient bonding material.

Figure 1:
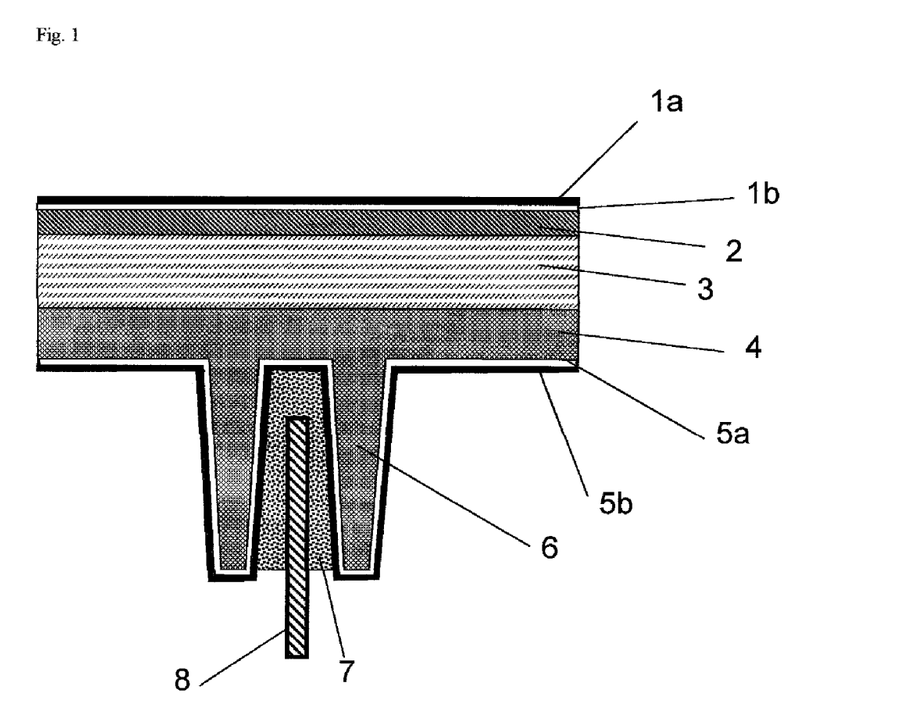
FIGS. 1-4 depict embodiments of the present invention.

In a preferred embodiment, a T-shaped support profile is received in a U-shaped rib profile, wherein the adhesive fills all 3 sides of the U-shaped rib profile in a uniform thickness in the range of from 1 to 5 mm (see FIG. 1).

The adhesive is preferably a 2K polyurethane system having a hardness of Shore A 70.

In a particularly preferred embodiment, the metallic hinge components are bonded by way of a 2K polyurethane system having a hardness of Shore A 70 to the support or to a layer bonded to the support.

Another possible process for producing such plastics composite components is a multi-component injection moulding process, in which the support profile is already in position in the corresponding mould and the plastics material and also the thermoplastic elastomer, which acts as the adhesive, are injected in.

The composite component according to the invention has the advantage that very few demands are made of the geometry of the support profile. Simple metal reinforcing sheets can be inserted, deviations from tolerance limits can be compensated for by the thickness of the adhesive layer. The simple geometry means that there is no waste material, and less support profile is required due to the vertical arrangement of the support profile and the main face of the base body. This means on the one hand cost efficiency due to lower material costs and lower production costs of the support profile, and on the other hand a reduction in the weight of the finished part. By means of the adhesive layers, stresses that occur are distributed uniformly in the plastics material over a wide area, so that stress peaks do not occur. The new technology accordingly also allows components of amorphous thermoplastics to be reinforced with metal profiles. The nature and degree of the stiffening and isolation can be adjusted very flexibly by way of the rib geometry and the thickness of the adhesive layers. Vibrations and noise are suppressed by the damping properties of the adhesive layer.

Damping materials (VIII) can be applied, preferably by a direct coating process, to the inside of the components, optionally also between or over the reinforcing elements, for the purposes of insulation and noise damping. Polyurethane systems are preferably used therefor. In a preferred embodiment, the damping layer is provided with a further lacquer layer or surface layer so that an inner surface of the component that is attractive both visually and in terms of feel is obtained.

Vehicle components within the scope of the present invention are, for example, tailgates, roof modules, side doors, mudguards, bonnet modules, windscreen modules or side window modules, preference being given to tailgates.

A tailgate based on a support (I) of Makrolon® AG2677 from Bayer MaterialScience AG was produced by the injection compression moulding process. Three different multi-layer composites comprising the carrier (I) were thereby produced according to FIGS. 1, 2 and 3. In a preferred embodiment, the tailgate comprises the functional elements according to FIG. 4.

Figure 2:
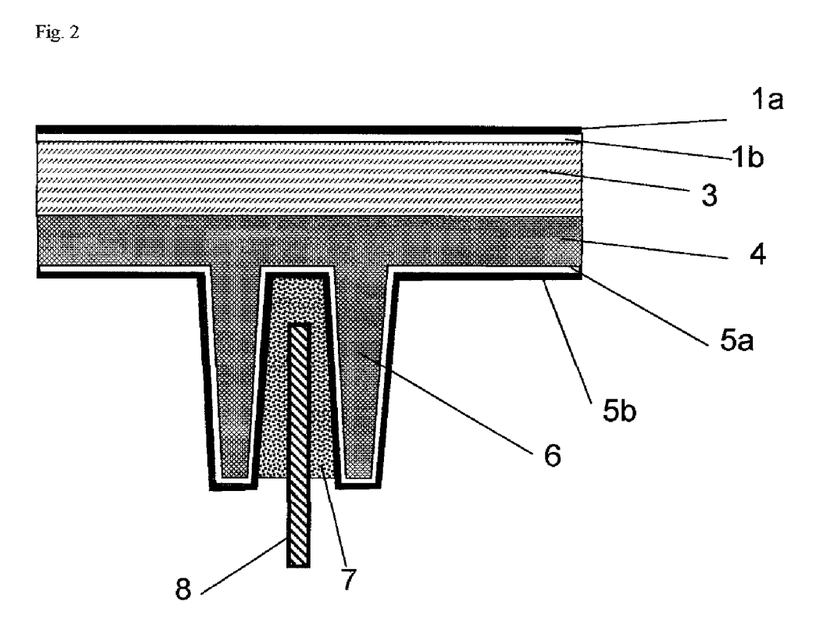
Figure 3:
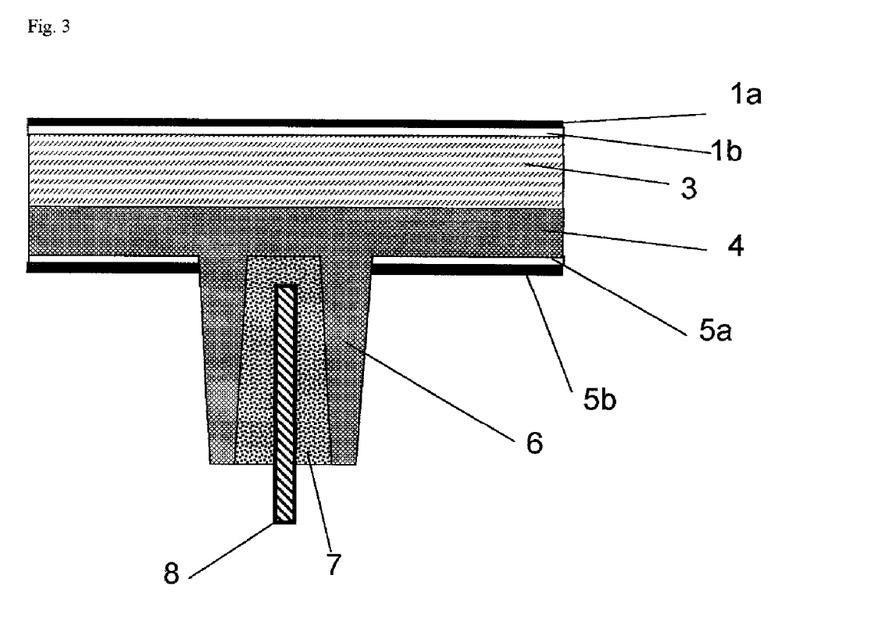

Multi-layer composite according to FIG. 1:
Layer for increasing the scratch resistance (II): scratch-resistant coating consisting of 1a scratch-resistant lacquer (AS4700) and 1b primer (SHP470 FT2050)
2: film chosen from the group of layers (II), (IV) or (VII)
3: support (I): transparent component: Makrolon AG2677
4: layer for forming black edges, reinforcing frame elements (V): Bayblend T95 MF coloured
5: layer for increasing the scratch resistance (II): consisting of 5a primer (SHP470 FT2050) and 5b scratch-resistant lacquer (AS700)
Mechanical reinforcing element (VI) consisting of
6: integrally moulded rib element
7: adhesive
8: support profile in the form of a metal insert
The reference numerals in FIG. 2 have the following meanings:

Layer for increasing the scratch resistance (II): scratch-resistant coating consisting of 1a scratch-resistant lacquer (AS4700) and 1b primer (SHP470 FT2050)
3: support (I): transparent component: Makrolon AG2677
4: layer for forming black edges, reinforcing frame elements (V): Bayblend T95 MF coloured
Layer for increasing the scratch resistance (II): consisting of 5a primer (SHP470 FT2050) and 5b scratch-resistant lacquer (AS4700)
Mechanical reinforcing element (VI) consisting of
6: integrally moulded rib element
7: adhesive
8: support profile in the form of a metal insert
The reference numerals in FIG. 3 have the following meanings:
Layer for increasing the scratch resistance (II): scratch-resistant coating consisting of 1a scratch-resistant lacquer (AS4700) and 1b primer (SHP470 FT2050)
3: support (I): transparent component: Makrolon AG2677
4: layer for forming black edges, reinforcing frame elements (V): Makroblend 7665
Layer for increasing the scratch resistance (II): consisting of 5a primer (SHP470 FT2050) and 5b scratch-resistant lacquer (AS4700)
Mechanical reinforcing element (VI) consisting of
6: integrally moulded rib element
7: adhesive
8: support profile in the form of a metal insert
The materials used are described below:

Makrolon® AG2677 is a linear, UV-stabilised and easily demouldable polycarbonate based on bisphenol A. Makrolon® AG2677 has a melt volume-flow rate MVR according to ISO 1133 of 12.5 $cm^3$/10 min, measured at 300° C. under a 1.2 kg load. The product is obtainable from Bayer MaterialScience AG, Leverkusen.

Makroblend® 7665 is an elastomer-modified polycarbonate/polyethylene terephthalate blend with 20% mineral filling having a melt volume-flow rate MVR according to ISO 1133 of 14 $cm^3$/10 min, measured at 270° C. under a 5 kg load. The product is obtainable from Bayer MaterialScience AG, Leverkusen.

Makroblend® UT235M is a mineral-filled, easily demouldable polycarbonate/polyethylene terephthalate blend with a melt volume-flow rate MVR according to ISO 1133 of 35 $cm^3$/10 min, measured at 270° C. under a 5 kg load. The product is obtainable from Bayer MaterialScience AG, Leverkusen.

Bayblend® T95MF is a polycarbonate/ABS blend with 9% mineral filling and a melt-volume flow rate MVR according to ISO 1133 of 18 $cm^3$/10 min, measured at 260° C. under a 5 kg load. The product is obtainable from Bayer MaterialScience AG, Leverkusen.

Scratch-resistant lacquer AS4700 is a thermally curing silicone-based lacquer comprising isopropanol, n-butanol and methanol as solvents, with a solids content of 25 wt. %, a density of 0.92 and a viscosity, measured at 25° C., of 3-7. The product is obtainable from Momentive Performance Materials GmbH, Leverkusen.

SHP470 is a primer with a solids content of 7 wt. %, a density of 0.94 and a viscosity at 25° C. of from 30 to 60, based on 1-methoxy-2-propanol as solvent. The product is obtainable from Momentive Performance Materials GmbH, Leverkusen.

Adhesive is a highly viscous, moisture-curing 1K polyurethane system (for example DOW Betaseal 1842).

Various processes are possible for producing the multi-layer composites of the implementation examples:

Steps for producing the multi-layer composite according to FIG. 1:

Procedure 1—insertion of the film 2 into the injection moulding mould—closing of the mould     injection of 3 (Makrolon® AG2677), then cooling to <145° C. component temperature (more preferably <130° C., particularly preferably <120° C.), but not below 80° C.

rotation of the cavity into the next position, for the injection of 4 (when the mould is closed in that position a gap is formed between the 1st solidified material component and the wall of the mould).

injection of 4, then cooling to <145° C. component temperature (more preferably <130° C., particularly preferably <120°), but not below 80° C.

In an alternative form of procedure 1, it is also possible to omit the film 2 in the production.

Figure 4:
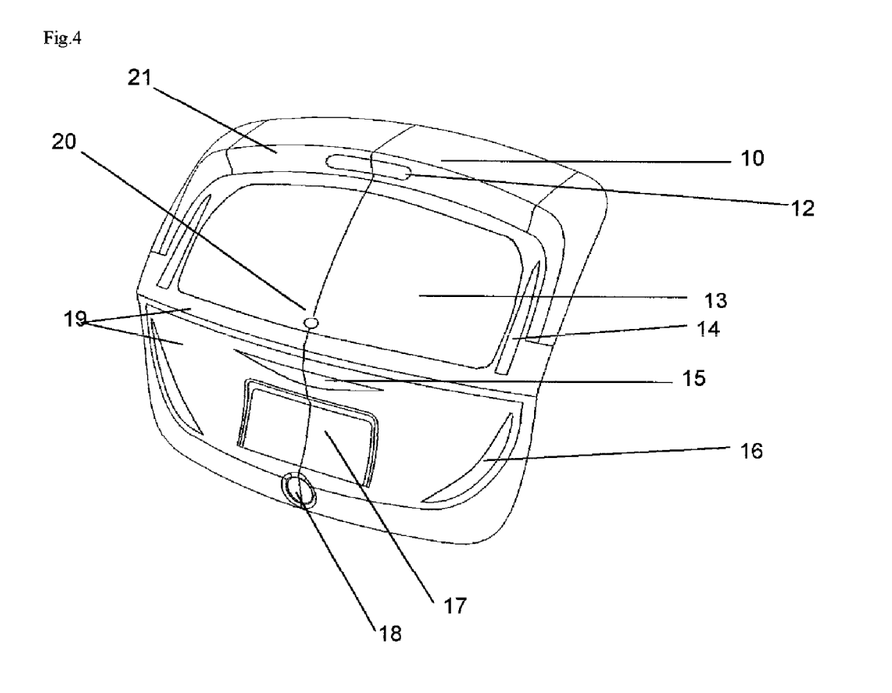

Procedure 2: coating—alternative A), subsequent to procedure 1 demoulding cooling of the component to room temperature flood coating of the component with the primer SHP470 FT2050 1b, 5a     evaporation of the solvents (preferably for at least 30 minutes)

curing/drying of the primer at from 20° C. [MW1] to 200° C., preferably from 40° C. to 130° C. (preferably for 45 minutes at 130° C.).

cooling to room temperature coating with top coat: AS4700 1a, 5b evaporation of the solvents (preferably for at least 30 minutes)—curing/drying of the top coat 1a, 5b at from 20° C. to 200° C., preferably from 40° C. to 130° C. (preferably for 45 minutes at 130° C.)—cooling to room temperature     introduction of the adhesive 7 between the rib elements     embedding of the stiffening element (metal) 8 into the adhesive     curing of the adhesive Procedure 3: alternative coating to procedure 2: coating as direct coating subsequent to procedure 1:

rotation of the cavity into the next position, for injection of the PU lacquer system     (when the tool is closed in that position, a gap forms between the 1st solidified material component and the wall of the mould) (this step can optionally also be carried out before back injection with the layer V or VI)

injection of the PU lacquer system demoulding cooling to room temperature introduction of the adhesive between the rib elements embedding of the stiffening element (metal) into the adhesive     curing of the adhesive Description of the functional elements (FIG. 4)

10 tailgate
12 transparent region for 3rd brake light
13 transparent region as rear window
14 transparent region for indicator
15 transparent region as window
16 transparent region for rear lights
17 registration plate recess
18 logo
19 region with black background
20 opening for windscreen wiper
21 spoiler Owing to the design of the component, various functional elements can be integrated. By shaping the upper end region, a spoiler (21), for example, is formed, in which a transparent region for the third brake light (12) is further integrated. Transparent regions for indicators (14) and rear lights (16) are also provided, as well as a further transparent region beneath the windscreen wiper holder (with integrated opening 20)). Recesses for the logo (18) and registration plate (17) are also integrated.

The invention claimed is:

1. A seamless one piece tailgate, comprising
at least one continuous support made of a thermoplastic plastics material,
wherein the tailgate has at least one transparent region, and wherein the tailgate comprises several functional elements, which are integrally moulded with and/or integrated in the tailgate, wherein different regions of the support are produced from different thermoplastic polymers by integral moulding, wherein at least one region is transparent and one region is not transparent.

2. The tailgate according to claim 1, wherein the support has a thickness of from 3 to 7 mm.

3. The tailgate according to claim 1, wherein the thickness of the support varies by not more than 10% over an entirety of the tailgate.

4. The tailgate according to claim 1, wherein the thermoplastic plastics material of the support comprises polycarbonate.

5. The tailgate according to claim 4, wherein the polycarbonate has a molecular weight $M_w$ of from 25,000 to 27,000.

6. The tailgate according to claim 1, wherein the support has a light transmission of at least 6% and a haze of at most 3%.

7. The tailgate according to claim 1, wherein the tailgate comprises at least one mechanical reinforcing element.

8. The tailgate according to claim 1, wherein the support has at least one further layer selected from the group consisting of
layers for increasing the scratch resistance,
layers for protecting against the effects of the weather,
colouring layers comprising colourants and/or pigments,
layers for forming black edges and/or reinforcing frame elements,
mechanical reinforcing elements,
functional layers selected from the group consisting of antifog and antireflection layers and layers for controlling transparency by electrochromism, thermotropicity and thermochromism, and
damping and insulating layers.

9. The tailgate according to claim 1, wherein at least one of the several functional elements is selected from the group consisting of hinges, heating elements, antennae, closing functionalities, lamp housing/holder, registration plate light, high-level brake lights, windscreen wiper and windscreen wiper motor holder, registration plate recess, logo recess, spoiler, styling lines, structural elements for water management, number plate holder, external or internal, and solar modules.

10. The tailgate according to claim 1, wherein the thickness of the support material is reduced in a region of one or more further layers on the application side of the layers in such a manner that the thickness of the one or more further layers corresponds to the reduced thickness of the support material.

11. The tailgate according claim 8, wherein said tailgate comprises at least one of said layers for forming black edges and wherein the coefficient of linear thermal expansion of material of the black edge, in the longitudinal direction, is from $1 \times 10^{-5}$ to $3 \times 10^{-5}$ (mm/mm K) lower than that of the support material.

12. The tailgate according to claim 1, wherein the support has a thickness of from 4 to 6 mm.

13. The tailgate according to claim 1, wherein the thickness of the support varies by not 5% over an entirety of the tailgate.

14. The tailgate according to claim 1, wherein the several functional elements are selected from the group consisting of antennae, closing functionalities, a lamp housing/holder, and a combination thereof.

15. The tailgate according to claim 14, wherein the lamp housing/holder is for a rear light, an indicator, a brake light, a registration plate light, or a high-level brake light.

16. A seamless one piece tailgate, comprising
at least one continuous support made of a thermoplastic plastics material, wherein the tailgate has at least one transparent region comprising several functional elements, which are integrally moulded with and/or integrated in the tailgate, and the tailgate comprising the following layer structure:
a) layer for increasing the scratch resistance,
b) IR protection film,
c) support,
d) layer for forming black edges and reinforcing frame elements,
e) layer for increasing the scratch resistance,
f) mechanical reinforcing element comprising a support profile bonded by way of a resilient adhesive to an integrally moulded rib element.

17. A method for producing the tailgate of claim 1, comprising:
optionally inserting a film into an injection moulding mould, closing the mould,
injecting a support of different thermoplastic materials and subsequent cooling to <145° C. tailgate temperature,
rotating a cavity of the mould into next position in order to create a gap for injecting a black edge,
injecting the black edge and subsequent cooling to <145° C. tailgate temperature,
demoulding,
cooling the tailgate to room temperature,
optionally flood coating the tailgate with a primer, evaporation of solvent
curing/drying the primer at from 20° C. to 200° C., optionally from 40° C. to 130° C.,
cooling to room temperature,
coating with top coat,
evaporating a solvent,
curing/drying the top coat at from 20° C. to 200° C., optionally from 40° C. to 130° C.,
cooling to room temperature,
introducing an adhesive between rib elements,
embedding a stiffening element (metal) into the adhesive, and
curing the adhesive.

18. A method for producing the tailgate of claim 1, comprising:
optionally inserting a film into an injection moulding mould, closing the mould
injecting a support of different thermoplastic materials and subsequent cooling to <145° C. tailgate temperature,
rotating a cavity of the mould into next position in order to create a gap for injecting a black edge,
injecting the black edge and subsequent cooling to <145° C. tailgate temperature,
rotating the cavity into next position for injecting a PU lacquer system,
injecting the PU lacquer system,
demoulding,
cooling to room temperature,
introducing an adhesive between rib elements,
embedding a stiffening element (metal) into the adhesive, and
curing the adhesive.

* * * * *